United States Patent
Jin et al.

(10) Patent No.: US 11,080,927 B2
(45) Date of Patent: Aug. 3, 2021

(54) METHOD AND APPARATUS OF CROSS SHADER COMPILATION

(71) Applicant: Advanced Micro Devices, Inc., Sunnyvale, CA (US)

(72) Inventors: Guohua Jin, Boxborough, MA (US); Michael John Bedy, Boxborough, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/827,909

(22) Filed: Nov. 30, 2017

(65) Prior Publication Data

US 2019/0164337 A1 May 30, 2019

(51) Int. Cl.
| | |
|---|---|
| *G06T 15/80* | (2011.01) |
| *G06T 15/00* | (2011.01) |
| *G06T 15/10* | (2011.01) |
| *G06F 8/41* | (2018.01) |
| *G06T 1/20* | (2006.01) |
| *G06T 1/00* | (2006.01) |
| *G06T 3/00* | (2006.01) |

(52) U.S. Cl.
CPC ............... *G06T 15/80* (2013.01); *G06F 8/41* (2013.01); *G06F 8/4436* (2013.01); *G06T 1/0007* (2013.01); *G06T 1/20* (2013.01); *G06T 3/0006* (2013.01); *G06T 15/005* (2013.01); *G06T 15/10* (2013.01)

(58) Field of Classification Search
None
See application file for complete search history.

(56) References Cited

U.S. PATENT DOCUMENTS

| | | | |
|---|---|---|---|
| 8,400,454 B2 | 3/2013 | Bleiweiss | |
| 2004/0207622 A1* | 10/2004 | Deering | G06T 15/50 345/426 |
| 2004/0239672 A1* | 12/2004 | Schmidt | G06T 15/80 345/426 |
| 2006/0071933 A1* | 4/2006 | Green | G06T 15/80 345/426 |
| 2008/0001952 A1* | 1/2008 | Srinivasan | G06T 1/20 345/502 |
| 2008/0001956 A1* | 1/2008 | Markovic | G06T 15/005 345/522 |
| 2013/0265309 A1* | 10/2013 | Goel | G06T 15/80 345/426 |
| 2014/0347371 A1* | 11/2014 | Stenson | G06T 1/20 345/501 |

(Continued)

*Primary Examiner* — YuJang Tswei
(74) *Attorney, Agent, or Firm* — Faegre Drinker Biddle & Reath LLP

(57) ABSTRACT

A method and apparatus provides for compiling a plurality of shaders, each shader having a plurality of computer-readable statements, into a plurality of computer-executable instructions. In one example, the method and apparatus, using a computing device, receives the plurality of shaders used in a process pipeline for performing at least one shading function, determines a shader type of each of the plurality of shaders based on the at least one shading function, and compiles the plurality of shaders by generating the computer-executable instructions using data including a shader descriptor for each of the plurality of shaders, resulting in the shading functions of the plurality of shaders combined together.

22 Claims, 8 Drawing Sheets

(56) References Cited

U.S. PATENT DOCUMENTS

| | | | | |
|---|---|---|---|---|
| 2015/0348224 A1* | 12/2015 | Avkarogullari | ........... | G06F 3/14 |
| | | | | 345/506 |
| 2016/0055667 A1* | 2/2016 | Goel | ....................... | G06T 15/83 |
| | | | | 345/522 |
| 2017/0256020 A1* | 9/2017 | Sansottera | ................ | G06T 1/20 |
| 2017/0323475 A1* | 11/2017 | Moreton | ................ | G06T 15/20 |

\* cited by examiner

METHOD AND APPARATUS OF CROSS SHADER COMPILATION

BACKGROUND OF THE DISCLOSURE

Recent improvements in graphics processing units (e.g., GPUs or APUs) and other processors allow users to program graphics pipeline units using micro-coded programs, such as pixel programs or shaders, to implement various user-defined shading algorithms and programs. Each shader includes instructions that perform shading in an image, such as light, darkness, and color control, rendering specific effects on graphics hardware and providing a high degree of flexibility for the users. While these graphics processing units are able to execute the instructions, the shaders are separately compiled and performed during operation. As a result, the shaders are executed separately creating multiple operating stages in a graphics pipeline. Each stage in the graphics pipeline performs a specific sequence of operations on the image and generates outputs used by a subsequent stage. During the subsequent stage, the output data from the previous stage is read from memory and processed.

For large shaders, functions and function calls are often used within a shader. A calling convention is commonly used by compilers for generating instructions to call from a caller to a callee and pass information between them. Compilers may also inline functions to reduce runtime overhead from function calls and generate more efficient code. However, this function in-lining technique only applies to shaders available at compile time and shaders of the same shader types. This limits the flexibility of separate compilation of multiple shaders and increases operational expenses, minimizing an overall benefit of compilation. A compilation technique that provides a generalized compilation method between multiple shaders is currently unavailable. Accordingly, there exists a need for improved method and apparatus for compiling shaders in order to address one or more of the above-noted drawbacks.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF EMBODIMENTS

Figure 1:
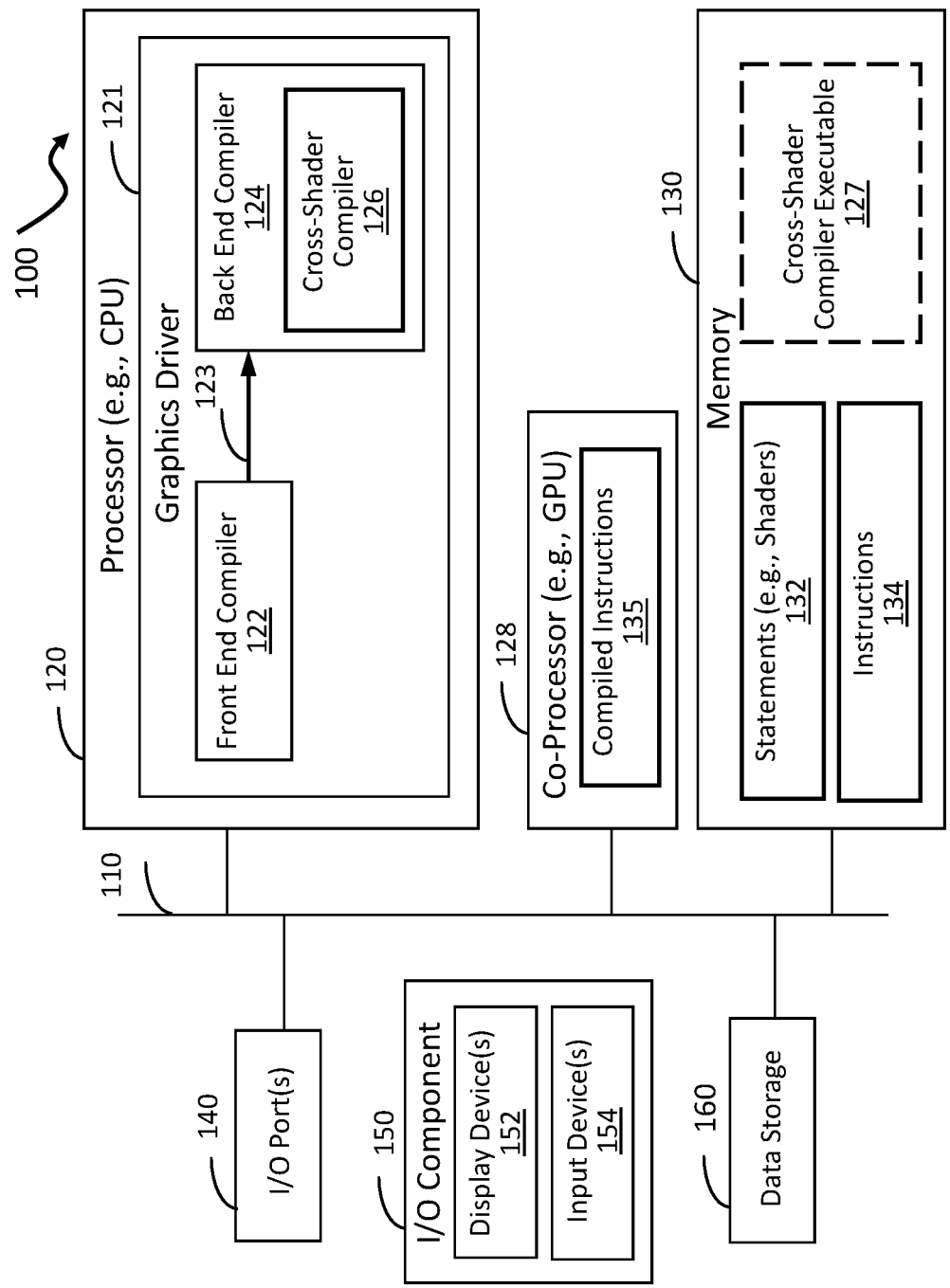
FIG. 1 is a schematic block diagram illustrating one example of an apparatus for compiling computer-readable computer programs in accordance with one embodiment set forth in the disclosure.

Briefly, in one example, a method and apparatus provides for compiling a plurality of shaders into a plurality of computer-executable instructions. Each shader includes a plurality of computer-readable statements for facilitating production of shading in an image, such as light, darkness, and color control, rendering specific effects on graphics hardware. In one example, the method and apparatus, using a computing device, receives the plurality of shaders used in a process pipeline for performing at least one shading function. The process pipeline refers to at least one of a graphics pipeline and a compute pipeline. The method and apparatus compiles the plurality of shaders by generating the computer-executable instructions using data or internal representation including shader descriptors for the plurality of shaders, and call and return value instructions created during compilation, resulting in the shading functions of the plurality of shaders combined together. Each shader descriptor and additional control and data flow instructions provide a generalized compilation method for multiple shaders to communicate data and run the shaders together.

For example, in the process pipeline, one or more shaders process information related to the image through a multi-stage process in which each shader of a corresponding stage performs a specific sequence of operations on the information and generates outputs for a subsequent stage. During the subsequent stage, the output is read from memory and processed. The method and apparatus determines a shader type of each of the plurality of shaders based on the at least one shading function. Exemplary shader types include a vertex shader, a geometry shader, a fetch shader, a hull shader, and the like, for accommodating an efficient use of processing power of each shader type. Detailed descriptions of the shader types are provided below in paragraphs related to FIGS. 7-9.

In one embodiment, the internal representation or data including the shader descriptor includes one or more parameters used during compilation of the shaders as arguments or return values of shaders set by the compiler. The parameters used vary depending on shaders and their types. In embodiments, the internal representation or data includes one or more parameters, function calls, or return values instructions used for the shaders. Detailed descriptions of the parameters are provided below in paragraphs related to FIGS. 7-9. Since the shaders are compiled using shader descriptors, data communication between shaders is naturally represented and efficiently generated to ensure their seamless execution on a pipeline stage.

In one embodiment, the method and apparatus identifies, for each received shader, at least one combinable shader that is compatible with the received shader based on the shader type. In one example, when the shader type is a fetch shader, the fetch shader is combinable with a vertex shader. For example, the vertex shader receives the vertex index information as input and outputs vertex attributes, such as position, color, and texture coordinate data. As another example, the fetch shader fetches texture data and vertex information related to the image and provides texture and vertex data that are applied to the image. In one embodiment, the fetch shader is created at run time by a graphics driver.

In another example, when a shader is compiled for running as a merged shader in the graphics pipeline, a shader compiled for a local shader is combinable with a hull shader. Shaders compiled for the merged shader are of different shader types. In one embodiment, a vertex shader and the hull shader are compiled to run on a merged local and hull shader. For example, the local shader manipulates a position, texture coordinates, and color of each vertex in a primitive. As another example, the hull shader computes color and attributes, such as light, shadows, specular highlights, translucency, etc., for each output control point of a patch and calculates tessellation factors for the image to provide meshes to be sub-divided into finer meshes at run time according to a mathematical function. The hull shader transmits the calculated tessellation factors to the subsequent stage for a further tessellation process in the graphics pipeline.

In another embodiment, a vertex shader and a geometry shader are compiled to run on a merged export and geometry shader. For example, the export shader runs a vertex shader and prepares data for a vertex of each primitive used by geometry shader, or run a domain shader (or a tessellation evaluation shader) for tessellation process. As another example, the geometry shader accepts primitives, such as a point, line, triangle with or without adjacency or patch list as input, and performs one-to-many triangle mapping to provide geometry amplification within the graphics pipeline.

In yet another example, a dispatch draw compute shader is combined with a transform shader and a fetch shader at runtime. For example, the dispatch draw compute shader runs together with the transform shader and fetch shader in a separate pipeline running asynchronously with the graphics pipeline. In one example, the transform shader is created from a vertex shader to calculate vertex positions. In another example, the dispatch draw shader is created from a compute shader running a primitive culling or removing function based on vertex positions of a primitive. One or more rendering programs allow the compute shaders to readily share and control the image information in the graphics or compute pipeline. In one example, the dispatch draw shader is used to remove primitives that are insignificant to rendering the image. For example, when the primitives are too small and do not contribute to a final rendered scene for the image, the dispatch draw shader removes such primitives to enhance the execution time and performance during run time.

In another embodiment, the shader descriptor includes at least one value, such as a vertex position or color attribute, that is returned to a calling shader (or caller) and a return address of the calling shader, as the at least one parameter. For merged shaders, no function call returns are needed. Input data available for the pipeline stage that are used by a called shader (or callee) (e.g. the geometry shader) are preserved through creating a return value instruction at the end of the calling shader (or caller) (e.g., a vertex shader) and setting return values in the shader descriptor for the caller. In yet another embodiment, the shader descriptor includes one or more storage locations modified by a called shader and saved by a calling shader or the called shader to prevent data in those locations from being overwritten.

FIG. 1 illustrates one example of an apparatus 100 for compiling a computer-readable computer program, such as the shader, in accordance with embodiments of the disclosure. In some implementations, the apparatus 100 includes any type of computing device suitable for implementing aspects of embodiments of the disclosed subject matter. Examples of computing devices include such "workstations," "servers," "laptops," "desktops," "tablet computers," "hand-held devices," "game consoles," "general-purpose graphics processing units (GPGPUs)," "APUs," "GPUs," and the like, all of which are contemplated within the scope of FIG. 1, with reference to various components of the system 100 and/or apparatus 100.

In one embodiment, the apparatus 100 includes a bus 110 that, directly and/or indirectly, couples the following devices: a processor 120 (e.g., CPU), a co-processor 128 (e.g., GPU), a memory 130, an input/output (I/O) port(s) 140, an I/O component(s) 150, and a data storage 160, such as a non-transitory storage medium. Any number of additional components, different components, and/or combinations of components is also included in the apparatus 100. In some implementations, the I/O component(s) 150 include a presentation component configured to present information to a user such as, for example, a display device, a speaker, a printing device, and/or the like, and/or an input component such as, for example, a microphone, a joystick, a satellite dish, a scanner, a printer, a wireless device, a keyboard, a pen, a voice input device, a touch input device, a touchscreen device, an interactive display device, a mouse, and/or the like.

The bus 110 represents one or more busses (such as, for example, an address bus, data bus, or combination thereof). Similarly, in some embodiments, the apparatus 100 includes a number of processors 120 and co-processors 128, a number of memory components 130, a number of I/O ports 140, a number of I/O components 150, and/or a number of storages 160. Additionally any number of these components, or combinations thereof, is distributed and/or duplicated across a number of computing devices.

In this example, the processor 120 includes a graphics driver 121 having a front end compiler 122 and a back end compiler 124. For example, the front end compiler 122 compiles the shader written in a high level computer program language (e.g., Open Graphics Library) into an intermediate computer program language 123, and the back end compiler 124 compiles the intermediate computer program language into low level computer-executable instructions. In the present disclosure, a cross-shader compiler 126 is configured to compile the shaders, each shader having a plurality of computer-readable statements, into a plurality of computer-executable instructions in accordance with one embodiment set forth in the disclosure. In one embodiment, the memory 130 includes computer-readable media in the form of volatile and/or nonvolatile memory. In other embodiments, the memory 130 is removable, nonremovable, or a combination thereof.

Media examples include Random Access Memory (RAM); Read Only Memory (ROM); Electronically Erasable Programmable Read Only Memory (EEPROM); flash memory; optical or holographic media; magnetic cassettes, magnetic storage devices; and/or any other medium that can be used to store information and can be accessed by a computing device such as, for example, quantum state memory, and/or the like. A distributed memory system shared in one or more servers (e.g., web servers or non-web servers) is also contemplated to suit different applications.

In this example, the memory 130 stores computer-readable statements 132 of the shaders to be compiled and computer-executable instructions 134 for causing the processor 120 and co-processor 128 to implement aspects of embodiments of system components discussed herein and/or to perform aspects of embodiments of methods and procedures discussed herein. During compilation of the computer-readable statements 132, cross-shader compiler executable 127 generated from the cross-shader compiler 126 temporarily resides in the memory 130 for processing the shaders. Further, the computer-readable statements 132 and instructions 134 are transmitted between and stored on the data storage 160 and/or the memory 130 via the bus 110, as desired. In another example, at least part of compiled instructions 135 generated by the cross-shader compiler 126 is stored in the co-processor 128.

The computer-executable instructions 134 and/or compiled instructions 135 include, for example, computer code, machine-useable instructions, and the like such as, for example, program components capable of being executed by one or more processors 120 associated with the apparatus 100. Program components are programmed using any number of different programming environments, including various languages, development kits, frameworks, and/or the like. Some or all of the functionality contemplated herein are also, or alternatively, implemented in hardware and/or firmware.

The illustrative apparatus 100 shown in FIG. 1 is not intended to suggest any limitation as to the scope of use or functionality of embodiments of the present disclosure. Neither should the illustrative apparatus 100 be interpreted as having any dependency or requirement related to any single component or combination of components illustrated therein. Additionally, various components depicted in FIG. 1 are, in embodiments, integrated with various ones of the other components depicted therein (and/or components not illustrated), all of which are considered to be within the ambit of the present disclosure.

Figure 2:
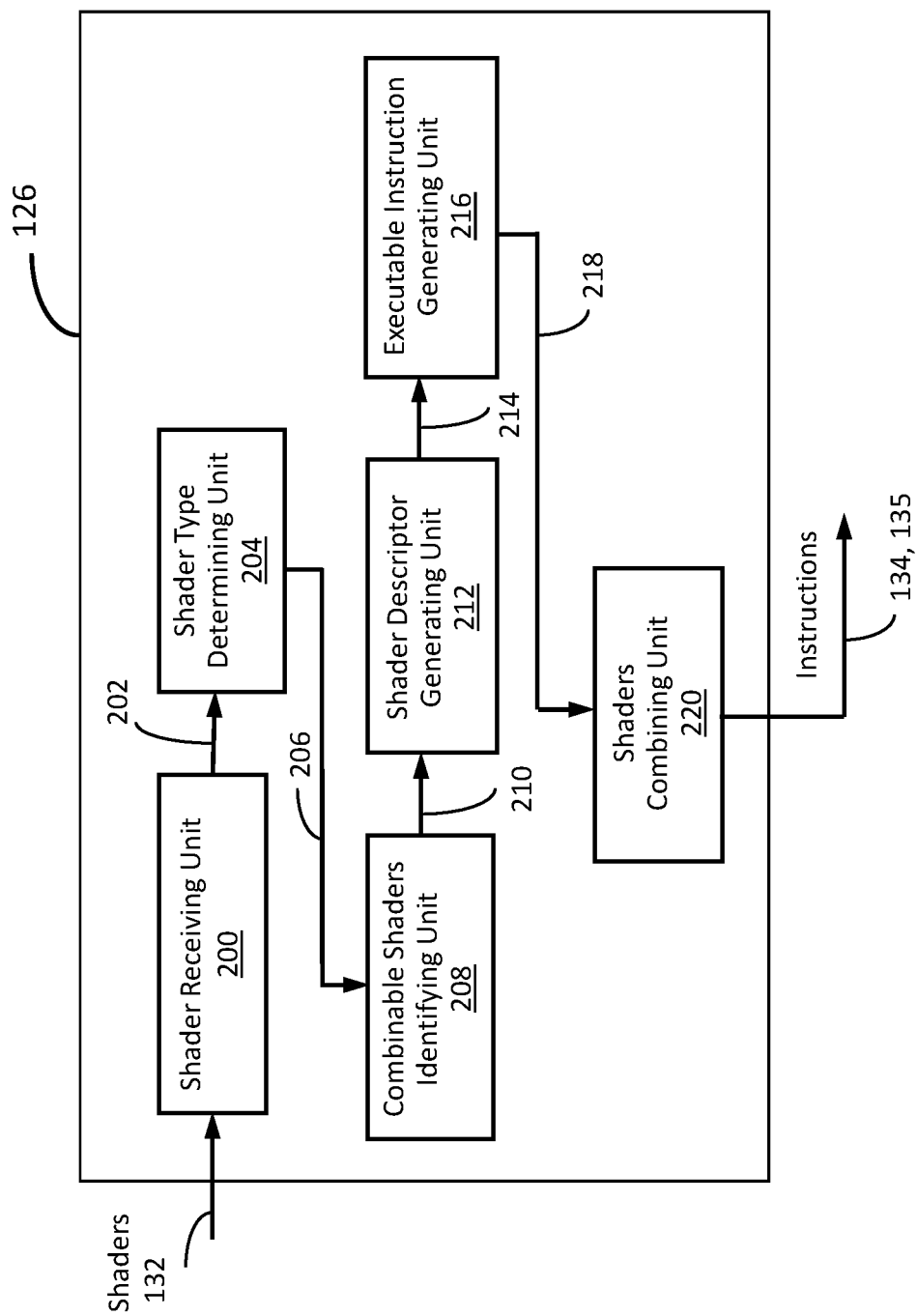
FIG. 2 is a block diagram illustrating the apparatus for compiling the computer-readable computer programs shown in FIG. 1.

FIG. 2 illustrates an exemplary cross-shader compiler 126. Embodiments of the present disclosure are described below by way of example only, with reference to the accompanying drawings. Further, the following description is merely exemplary in nature and is in no way intended to limit the disclosure, its application, or uses. As used herein, the term "unit" refers to, be part of, or include an Application Specific Integrated Circuit (ASIC), an electronic circuit, a processor or microprocessor (shared, dedicated, or group) and/or memory (shared, dedicated, or group) that executes one or more software or firmware programs, a combinational logic circuit, and/or other suitable components that provide the described functionality. Thus, while this disclosure includes particular examples and arrangements of the units, the scope of the present system should not be so limited since other modifications will become apparent to the skilled practitioner.

Referring now to the example shown in FIGS. 1 and 2, the cross-shader compiler 126 includes a shader receiving unit 200, a shader type determining unit 204, a combinable shaders identifying unit 208, a shader descriptor generating unit 212, an executable instruction generating unit 216, and a shaders combining unit 220. Although these sub-units 200, 204, 208, 212, 216, 220 are illustrated as children units subordinate of the parent unit, each sub-unit can be operated as a separate unit from the compiler unit 126, and other suitable combinations of sub-units are contemplated to suit different applications. In another embodiment, one or more units can be selectively bundled as a software model running on the processor or co-processor.

In this example, the cross-shader compiler 126 is configured to compile a plurality of shaders 132 having a plurality of computer-readable statements into a plurality of computer-executable instructions 134, 135. Initially, the shader receiving unit 200 is configured to receive the plurality of shaders 132 used in a process pipeline that includes a compute or graphics pipeline for performing at least one shading function. In embodiments, the process pipeline includes at least one of the compute pipeline and the graphics pipeline. For example, a dispatch draw compute shader and a transform shader with a fetch shader run asynchronously on a separate compute pipeline along with the graphics pipeline. The compute or graphics pipeline processes image information in a multi-stage process using one or more shaders 132. Received shaders 202 are transmitted to the shader type determining unit 204 that is configured to determine a shader type of each of the received shaders 202. The shader type determining unit 204 determines the shader type based on the at least one shading function. As discussed above, the shader types include the vertex shader, the fetch shader, and a shader compiled for the merged shader, the geometry shader, the hull shader, the compute shader, and the like, depending on different applications.

The shader type determining unit 204 transmits the received shaders 202 along with associated shader types 206 to the combinable shaders identifying unit 208 that is configured to identify at least one shader that is compatible with the received shaders 202 combinable at runtime based on the shader type. In one example, when the shader type is the fetch shader, the fetch shader is combinable with the vertex shader. In another example, when the shader type is a shader compiled for a merged shader, either the vertex shader is combinable with the hull shader, or a vertex or domain shader is combinable with the geometry shader. In yet another example, when the shader type is a dispatch draw compute shader, the compute shader is combinable with the fetch shader and the transform shader.

The shader descriptor generating unit 212 receives combinable shaders 210 identified by the combinable shaders identifying unit 208, and generates the shader descriptor with at least one parameter based on the shader type. In one example, when the shader type is the vertex shader or the compute shader, the data includes the unique identification number of the shader descriptor and the indirect call type. In another example, for the merged shader, two shaders share the same set of input data given at the pipeline stage. For example, the first merged shader (e.g., the vertex shader) runs to finish and calls to the second merged shader (e.g., the geometry shader) without return. Return_values is used along with a ret_value instruction for preserving input data needed by the second merged shader. An exemplary data structure SubrDescriptor of the shader descriptor is described below:

```
Class SubrDescriptor {
    id;                  // unique id number
    convention type;     // types of call convention
    return values;       // a list of returned values
    return addr;         // address for callee to return
    caller saved;        // physical registers clobbered by subroutine
    callee saved;        // physical registers saved by subroutine
    used regs;           // physical registers used by subroutine
    arguments;           // a list of arguments
}
```

The exemplary data structure SubrDescriptor is a class object having a plurality of object properties, including a unique identification number of the shader descriptor, and a convention type indicating a call type (e.g., a direct or indirect call type). Further included in properties of the shader descriptor object are a set of return values (e.g., a vertex position or color attribute) to the calling shader and a return address of the calling shader. In this example, a caller saved property has information about physical registers that can be overwritten by the called shader and saved by the caller, and a callee saved property has information about physical registers that can be saved by the called shader to avoid overriding them. Also, a used regs property has information about physical registers used or modified by the called shader. An arguments property in this example includes a set of arguments (e.g., temporary registers) used as inputs to the called shader. Exemplary argument values include vertex index or user data input values. Other suitable configurations are also contemplated to suit different applications.

Another exemplary data structure SubrParameter of the shader descriptor is described below:

```
Class SubrParameter {
    type;              // by_value
    location;          // scalar or vector
    location value;    // physical registers
    size;              // size of parameter
}
```

The exemplary data structure SubrParameter is a class object representing a property of each of the arguments or return values in SubrDescriptor. The property of each structure for both argument and return value includes a plurality of object properties, including a type indicating a method of return type for the called shader (e.g., return by value or return by reference), a location indicating a scalar or vector register, a location value of the physical register (e.g., 0, 1, 2, ..., N), and a size of the parameter (e.g., 8 bytes). Other suitable configurations are also contemplated to suit different applications.

The executable instruction generating unit 216 receives the combinable shaders 210 and internal representation including additional call and ret_value instructions together with the shader descriptor 214, and generates the compute-executable instructions 218 for each combinable shader.

The shaders combining unit 220 receives executable instructions 218 of each combinable shader from executable instruction generating unit 216, and combines them into executable instructions 134, 135. As such, it is advantageous that the at least two shaders are combined together and executed as a single stage in the process pipeline at run time using the generated computer-executable instructions 134, 135. In one example, the single stage in the process pipeline is a graphics pipeline stage. In another example, the single stage in the process pipeline is a compute pipeline stage.

Figure 3:
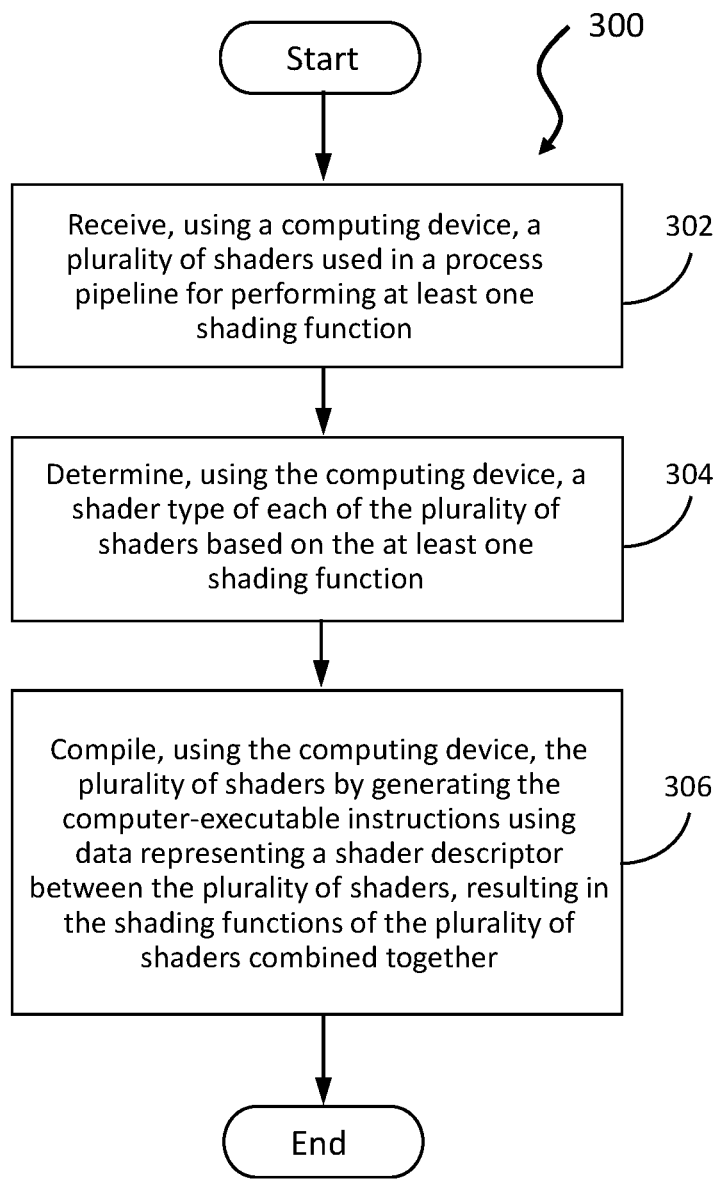
FIG. 3 is a flowchart illustrating one example of a method for compiling the computer-readable computer programs in accordance with one embodiment set forth in the disclosure.

FIG. 3 illustrates one example of a method 300 for compiling a plurality of shaders, each shader having a plurality of computer-readable statements, into a plurality of computer-executable instructions. It will be described with reference to FIGS. 1 and 2. However, any suitable structure can be employed.

In operation, at block 302, the shader receiving unit 200 receives, using a computing device, a plurality of shaders 132 used in a graphics or compute pipeline for performing at least one shading function. At block 304, the shader type determining unit 204 determines, using the computing device, a shader type of each of the received shaders 202 based on the at least one shading function. For example, the shader types include the vertex shader, the fetch shader, the shader compiled for merged shader, the geometry shader, the hull shader, the compute shader, and the like, depending on the applications. At block 306, the executable instruction generating unit 216 generates, using the computing device, the computer-executable instructions 134, 135 using data including a shader descriptor, such that at least two received shaders can be combined together. For example, two or more shaders (e.g., having different shader types) are compiled separately and combined to run on a hardware compute or graphics pipeline stage. The block 306 is further illustrated in FIGS. 4 and 5.

Figure 4:
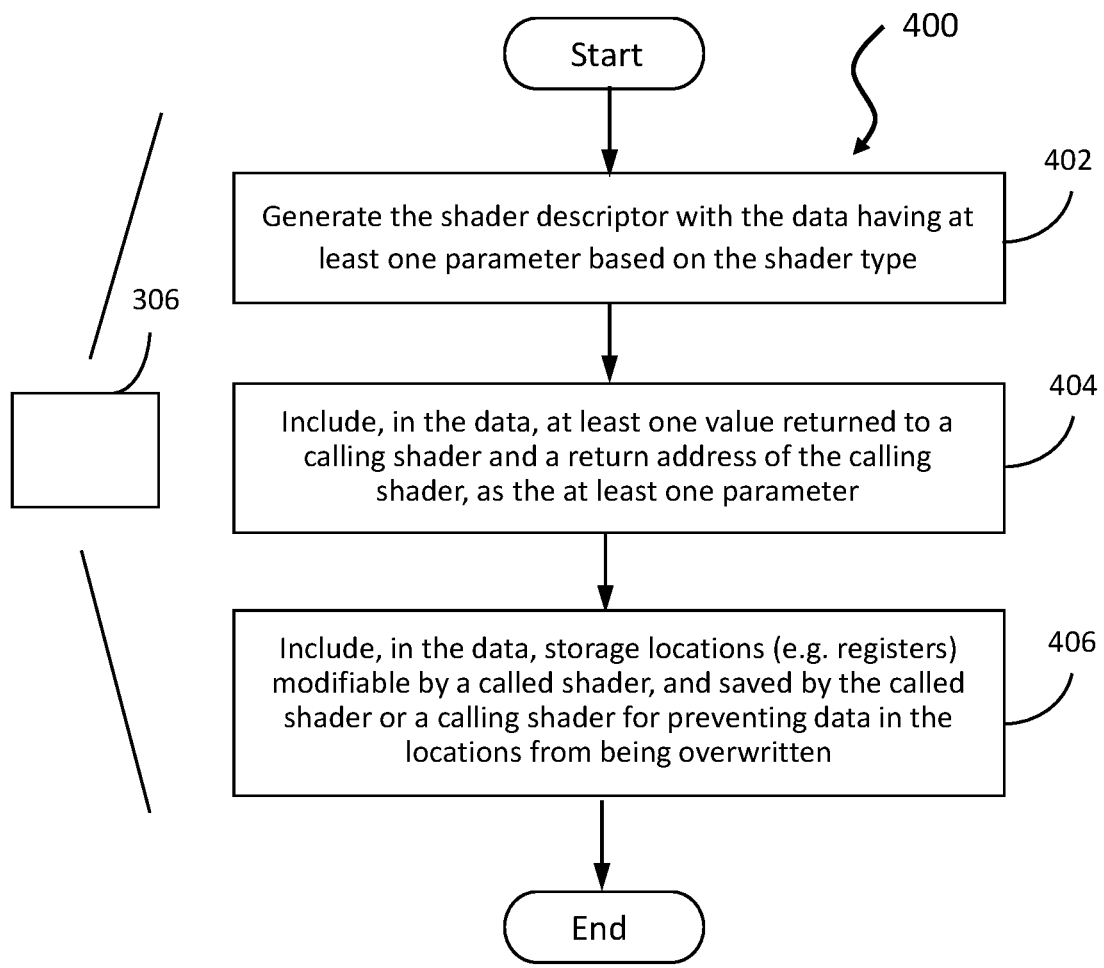
FIG. 4 is a flowchart illustrating another example of the method for compiling the computer-readable computer programs.

FIG. 4 illustrates another example of a method 400 for performing block 306 of FIG. 3 in accordance with one embodiment set forth in the disclosure. It will be described with reference to FIGS. 1-3. However, any suitable structure can be employed. Although three sub-blocks 402-406 are illustrated, other suitable sub-blocks can be employed to suit different applications.

At block 402, the shader descriptor generating unit 212 generates the shader descriptor with the data having at least one parameter based on the shader type. In one example, the data includes the unique identification number of the shader descriptor and the indirect call type. In another example, for the merged shader, no function call returns are needed once the second merged shader finishes execution and return values along with ret_value instruction are used for preserving input data needed by the second merged shader. In yet another example, arguments and return address, along with call instructions are used for passing data from the caller to the callee and for the callee returning execution back to the caller.

At block 404, the shader descriptor generating unit 212 includes, in the data, at least one value, such as a vertex position or color attribute, that is returned to a calling shader and a return address of the calling shader. At block 406, the shader descriptor generating unit 212 includes, in the data, one or more storage locations (e.g. registers) modifiable by a called shader, and saved by the called shader or a calling shader for preventing data in the locations from being overwritten.

Figure 5:
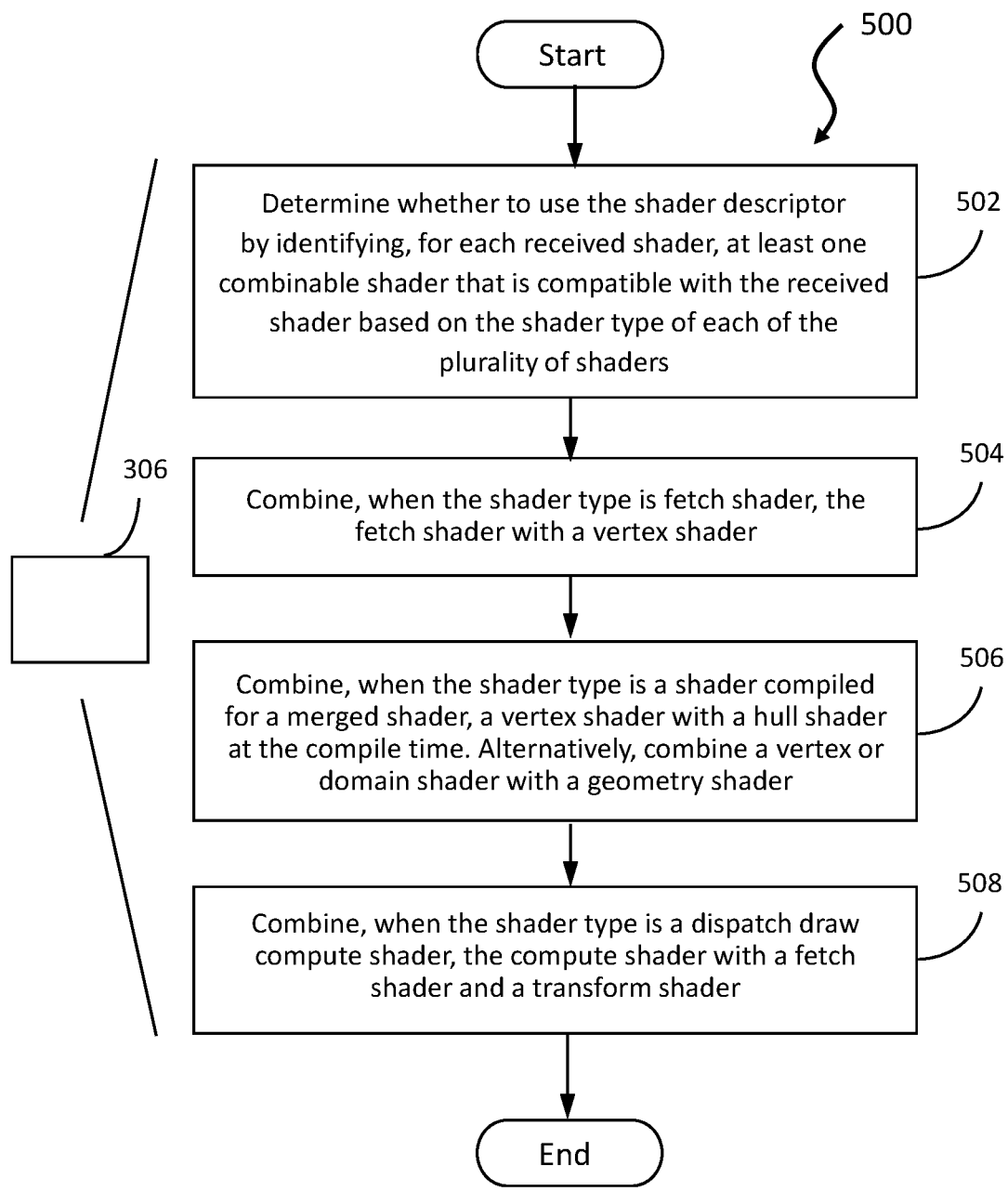
FIG. 5 is a flowchart illustrating still another example of the method for compiling the computer-readable computer programs.

FIG. 5 illustrates one example of a method 500 for performing block 306 of FIG. 3 in accordance with one embodiment set forth in the disclosure. It will be described with reference to FIGS. 1-4. However, any suitable structure can be employed. Although four sub-blocks 502-508 are illustrated, other suitable sub-blocks can be employed to suit different applications. In operation, at block 502, the combinable shaders identifying unit 208 identifies, for each received shader, at least one combinable shader that is compatible with the received shaders 202 based on the shader type. At block 504, the shaders combining unit 220 combines, when the shader type is a fetch shader, the fetch shader with a vertex shader. At block 506, the shaders combining unit 220 combines, when the shader type is a shader compiled for a merged shader, a vertex shader with a hull shader. Alternatively, the shaders combining unit 220 combines a vertex or domain shader with a geometry shader. At block 508, the shaders combining unit 220 combines, when the shader type is a dispatch draw compute shader, the computer shader with a fetch shader and a transform shader Although the processing blocks illustrated in FIGS. 3-5 are illustrated in a particular order, those having ordinary skill in the art will appreciate that the processing can be performed in different orders to suit different applications. In one example, blocks 504-508 can be performed essentially simultaneously.

Figure 6:
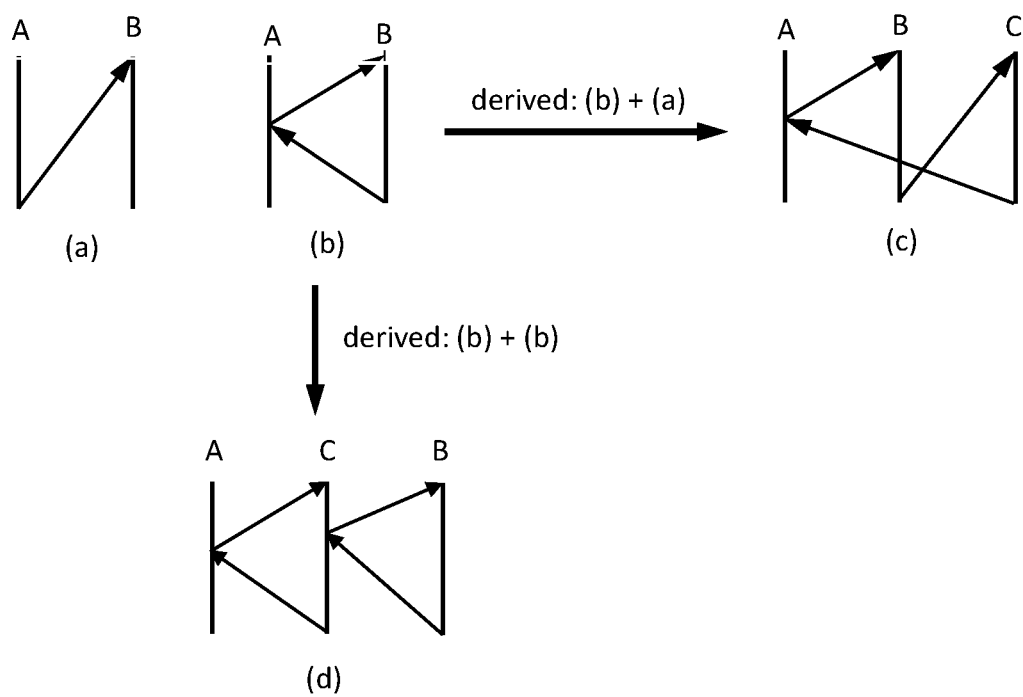
FIG. 6 is an exemplary pictorial presentation of basic multiple shader execution flows and combinations in accordance with one embodiment set forth in the disclosure.

FIG. 6 illustrates an exemplary pictorial representation of performing block 306 of FIG. 3 in accordance with one embodiment set forth in the disclosure. An exemplary execution order is shown in arrows in FIG. 6. In this example, FIG. 6 (a)-(d) depicts generalized call patterns of multiple shaders of different shader types, their execution paths, and communications between them. Further, S_in(A), S_in(B), and S_in(C) represent hardware generated system inputs to shaders A, B, and C. Further, U_in(A), U_in(B), and U_in(C) represent driver initialized user data inputs to shaders A, B, and C. R_in(A), R_in(B), and R_in(C) represent reserved resource for A, B, and C. Live(A) represents live registers in A before calling B. RE(B) represents return values from B.

In one embodiment, namely CASE(A), where shader A is executed and then shader B is executed, an exemplary pseudo code for compiling the shaders is provided as follows:

```
When compiling or generating A,
Create a return values instruction: ret_values S_in(B), U_in(B), . . .
Generate subroutine descriptor A:
    desc_A: S_in(B)_1: val: S3(4), . . .
        it describes return value S_in(B)_1 will be kept as value type,
        assigned scalar register type from 3 of size 4 bytes.
Create call instruction with no return: Call = addr(B) or concatenate (A,B)
```

For example, when compiling or generating shader A, a return values instruction is created as ret_values S_in(B), U_in(B), etc. Then, a subroutine descriptor A is generated as desc_A: S_in(B)_1: val: S3(4), etc. For example, return value S_in(B)_1 will be kept as value type, assigned scalar register type from 3 of size 4 bytes. Then, a call instruction with no return is created as Call=addr(B) or concatenate(A, B).

In another embodiment, namely CASE (B), where shader A calls shader B and returns and continues to finish shader A, an exemplary pseudo code for compiling the shaders is provided as follows:

```
When compiling or generating A,
Create call instruction: call retAddr, RE(B), . . . = addr(B), desc_B, S_in(B), U_in(B), R_in(B), . . .
Generate subroutine descriptor of B:
    desc_B: retAddr: val: S8(8), RE(B)_1: val: V8(12), . . . S_in(B)_1: val: V2(4), . . .
        it describes 1) return address has value type, assigned scalar register type from 8 of size
        8 bytes; 2) one of the returned values RE(B)_1 has value type, assigned vector register
        type from 8 of size 12 bytes; 3) one of the system inputs S_in(B)_1 has value type,
        assigned vector register type from 2 of size 4 bytes.
If compiling callee B before caller A, caller saved register information is used to save registers
before call and restore them after call. If compiling caller A before callee B, output live registers
Live(A).
When generating B,
not to modify S_in(A) U U_in(A) U R_in(A) (U Live(A) if B is compiled after A)
or when compiling B,
Create a return values instruction: ret_values S_in(A), U_in(A), R_in(A), Live(A), . . .
Generate subroutine descriptor A like case (a).
Create call instruction: Call = addr(retAddr)
```

For example, when compiling or generating shader A, a call instruction is created as call retAddr, RE(B), . . . =addr(B), desc_B, S_in(B), U_in(B), R_in(B), etc. Then, a subroutine descriptor of shader B is generated as desc_B: retAddr: val: S8(8), RE(B)_1: val: V8(12), . . . S_in(B)_1: val: V2(4), etc. For example, this describes 1) return address has value type, assigned scalar register type from 8 of size 8 bytes; 2) one of the returned values RE(B)_1 has value type, assigned vector register type from 8 of size 12 bytes; 3) one of the system inputs S_in(B)_1 has value type, assigned vector register type from 2 of size 4 bytes.

In one embodiment, if compiling a callee shader B before a caller shader A, caller saved register information is used to save registers before a call and restore them after call. In another embodiment, if compiling a caller A shader before a callee shader B, live registers Live(A) are outputted. For example, when generating shader B, not to modify S_in(A) U U_in(A) U R_in(A) (U Live(A) if shader B is compiled after shader A). As another example, when compiling shader B, a return values instruction is created as ret_values S_in (A), U_in(A), R_in(A), Live(A), etc. Also, a subroutine descriptor A is generated as shown in Case (a) above. A call instruction is created as Call=addr(retAddr).

In yet another embodiment, namely CASE (C), where a new CASE (C) is derived from CASE (A) and CASE (B), an exemplary pseudo code for compiling the shaders is provided as follows:

```
When compiling or generating A,
Create call instruction: call retAddr, RE(C), . . . = addr(B), desc_BC, S_in(B,C), U_in(B,C),
R_in(B,C), addr(C), . . .
Generate subroutine descriptor desc_BC for B and C:
    Desc_BC: retAddr: val: S2(8), RE(C)_1: val: V0(16), . . . S_in(B)_1: val: V0(4), . . .
        U_in(C)_1: val: S4(8)
```

It describes 1) return address is of value type in scalar register 2 of size 8 bytes; 2) one of the returned values RE(C)_1 has value type and assigned vector register 0 of size 16 bytes; 3) one of the system inputs of B S_in(B)_1 has value type and assigned vector register 0 of size 4 bytes; 4) one of the user data inputs of C U_in(C)_1 has value type and assigned scalar register 4 of size 8 bytes.

If A is compiled after B and C are compiled, caller saved register information is used to save registers before call and restore them after call.
When compiling or generating B,
Create a return values instruction: ret_values S_in(A,C), U_in(A,C), R_in(A,C), . . .
Not to modify S_in(A,C) U U_in(A,C) U R(A,C)
Create call instruction with no return: Call = addr(C)
When compiling or generating C,
Create a return values instruction: ret_values S_in(A), U_in(A), R_in(A), . . .
Not to modify S_in(A) U U_in(A) U R(A)
Create call instruction: Call = addr(retAddr)

For example, when a new CASE is derived from CASE (B)+CASE (A), shader A calls shader B, control executes shader B then executes C, and then returns to shader A and continues to finish shader A. In one example, when compiling or generating shader A, a call instruction is created as call retAddr, RE(C), . . . =addr(B), desc_BC, S_in(B,C), U_in(B,C), R_in(B,C), addr(C), etc. Then, a subroutine descriptor desc_BC for shader B and shader C is generated as desc_BC: retAddr: val: S2(8), RE(C)_1: val: V0(16), . . . S_in(B)_1: val: V0(4), . . . U_in(C)_1: val: S4(8), which describes 1) return address is of value type in scalar register 2 of size 8 bytes; 2) one of the returned values RE(C)_1 has value type and assigned vector register 0 of size 16 bytes; 3) one of the system inputs of B S_in(B)_1 has value type and assigned vector register 0 of size 4 bytes; 4) one of the user data inputs of C U_in(C)_1 has value type and assigned scalar register 4 of size 8 bytes. If shader A is compiled after shader B and shader C are compiled, caller saved register information is used to save registers before call and restore them after call.

In one example, when compiling or generating shader B, a return values instruction is created as ret_values S_in(A, C), U_in(A,C), R_in(A,C), etc., and do not modify S_in(A, C) U U_in(A,C) U R(A,C). A call instruction with no return is created as Call=addr(C). In another example, when compiling or generating shader C, a return values instruction is created as ret_values S_in(A), U_in(A), R_in(A), etc., and do not modify S_in(A) U U_in(A) U R(A). A call instruction is created as Call=addr(retAddr).

In still another embodiment, namely CASE (D), where a new CASE (D) is derived from a first CASE (B) and a second CASE (B), a similar call convention method for compiling the shaders is employed as shown in CASE (C) above.

Figure 7:
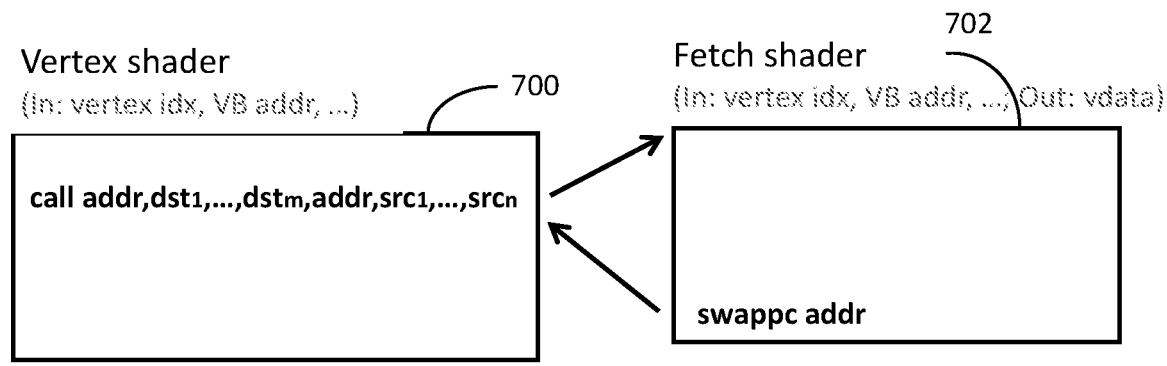
FIG. 7 is an exemplary pictorial representation of compiling a vertex shader and linking with a fetch shader in accordance with one embodiment set forth in the disclosure.
Figure 8:
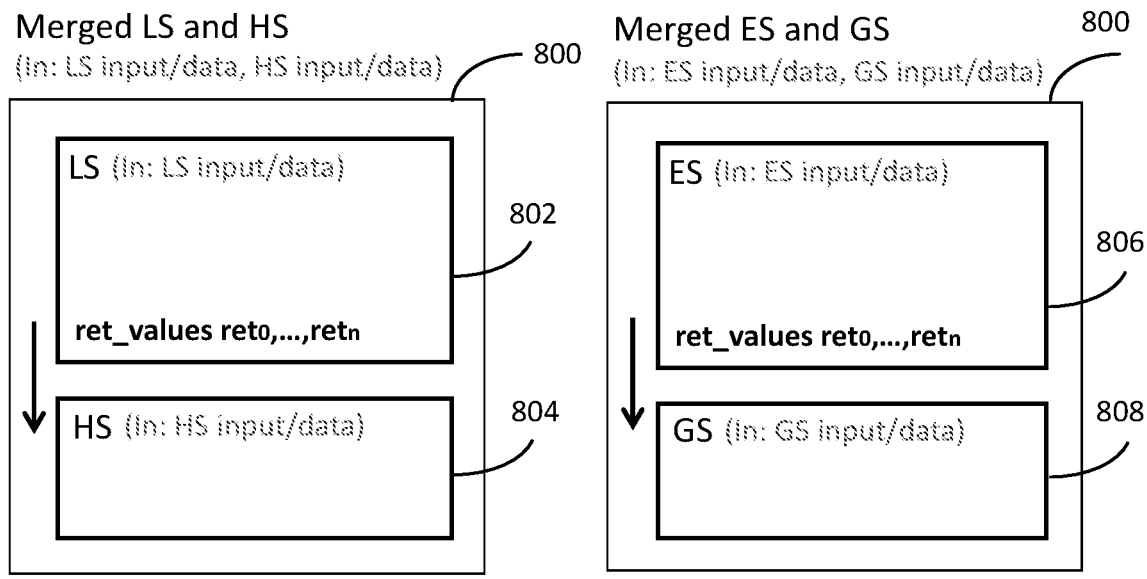
FIG. 8 is an exemplary pictorial representation of compiling for merged shaders in accordance with one embodiment set forth in the disclosure.
Figure 9:
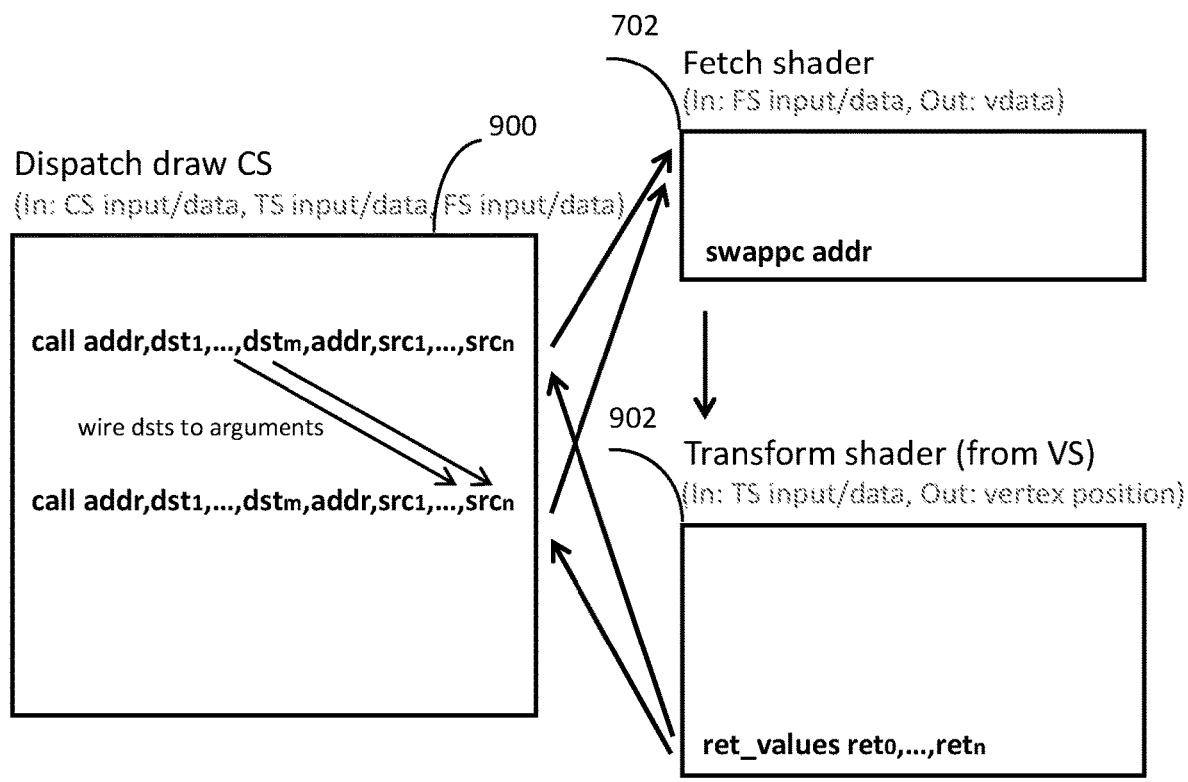
FIG. 9 is an exemplary pictorial representation of compiling a compute shader and a transform shader, and linking with a fetch shader in accordance with one embodiment set forth in the disclosure.

FIGS. 7-9 illustrate three exemplary examples of combining at least two combinable shaders at the compile time. An exemplary execution order is shown in arrows in FIGS. 7-9. In FIG. 7, when the shader type is the fetch shader, the fetch shader is combinable with the vertex shader at runtime. In one example, parameters shown on top of vertex shader 700 and fetch shader 702 are inputs to and outputs from each of the shaders. In this example, the graphics driver 121 creates a fetch shader 702 to fetch vertices based on a buffer layout unknown at compile time. In embodiments, a fetch shader call is previously implemented as a jump instruction under the assumption that the jump instruction appears at the beginning of the calling shader. However, the assumption becomes invalid in certain cases. A generalized approach of implementing the fetch shader call is provided by the cross-shader compiler 126.

For example, as shown in FIG. 7, a call instruction together with a shader descriptor including a return address are used for generating a call to the fetch shader 702 as a target of the call. Inputs and outputs of the fetch shader 702 are arguments and return values. Register mapping is recorded in the shader descriptor. In this example, since the fetch shader 702 is created after the vertex shader 700, the caller saved registers shown in SubrDescriptor are not used for restoring the data. Instead, information about registers live to the fetch shader call is passed in interface and used by a driver to prevent the fetch shader from overwriting them. Other suitable arrangements of values and registers shown in SubrDescriptor are also contemplated to suit the application.

In FIG. 8, when the shader type is a merged shader 800, either a vertex shader compiled for a local shader 802 is combinable with a hull shader 804, or a vertex or domain shader compiled for an export shader 806 is combinable with a geometry shader 808. In one example, to simplify the graphics pipeline, hardware stage local shader 802 and the hull shader 804 are combined (or merged) in the graphics hardware (e.g., integrated circuit chips). In another example, hardware stage export shader 806 and the geometry shader 808 are combined (or merged) in the graphics hardware.

In the merged local shader 802 and the hull shader 804, the shaders 802, 804 share the same system inputs and user data inputs as a common union of user data needed by both shaders 802, 804. In one example, when the merged shader 800 executes, the shader compiled for the local shader 802 runs first followed by the hull shader 804. There is no function call return needed after hull shader execution. As an example, during compilation, the shaders are compiled in a reverse order. User data and system inputs used by the hull shader 804 need to be accessible when the hull shader 804 starts. A ret_values instruction is used to specify registers that hold the data as return values to avoid values to be overwritten and a register mapping is recorded in the shader descriptor. In one example, to continue execution of the hull shader 804 after the local shader 802, both shaders 802 and 804 are concatenated. In another example, a jump instruction is inserted at the end of the local shader 802 to continue execution in the hull shader 804. For the merged shader 800 with the export shader 806 and the geometry shader 808, the shaders are compiled in a similar manner discussed above.

In FIG. 9, when the shader type is a dispatch draw compute shader 900, the compute shader 900 is combinable with the fetch shader 702 and a transform shader 902. The dispatch draw shader is used to remove primitives that do not contribute to a final rendered scene. In this example, the dispatch draw compute shader is generated by the compute shader 900, the transform shader 902 is generated by the vertex shader 700, and the fetch shader 702 is generated by the graphics driver 121.

For example, the dispatch draw compute shader 900 first calls the fetch shader 702 using a call instruction with a properly set shader descriptor. Then, the fetch shader 702 jumps to the transform shader 902, and the transform shader 902 returns to the dispatch draw compute shader 900 using a transform shader address passed in as an argument to the call and return address of the call. Also, the arguments property of the shader descriptor is used for system and user data inputs and transform shader address. In another example, the caller saved property based on information from the transform shader 902 is used to save and restore data before and after the call. To prevent generating unnecessary extra data move instructions between calls in the dispatch draw compute shader 900, a ret_values instruction is created at the end of the transform shader 902. In embodiments, outputs of the transform shader 902, user data inputs for the transform shader 902 and the fetch shader 702, and registers that are reserved or used as inputs for the fetch shader 702 are added into the instruction as return values. For example, the return values property with physical register mapping is created in the shader descriptor. In another example, user data of the transform shader 902 is added as return values into the calls in the dispatch draw compute shader 900 and the shader descriptor.

Although certain exemplary shaders are shown in FIGS. 6-9, any other suitable shaders are also contemplated to suit different applications. For example, tessellation shaders (e.g., a domain shader or a hull shader), geometry shaders (e.g., a geometry shader), pixel shaders, fetch shaders, and the like, are contemplated for compilation in accordance with the methods shown above. Among other advantages, for example, the cross-shader compiler described above is beneficial for applications using multiple shaders. In certain cases, the method and apparatus described above provide a significant performance improvement on central processing units such as multi-CPU core processor platforms or any other suitable processor. In addition, the cross-shader compiler ensures multiple compiled shaders to receive or generate correct inputs or outputs, and properly communicate data between the shaders to run them together on a graphics or compute pipeline stage. Further, the method and apparatus described above avoid unnecessary saving and restoring of registers in shaders or between shader calls during run time by using the shader descriptor. As such, an overall rendering operation and execution speed are improved at draw time of the image.

The above detailed description of the present disclosure and the examples described therein have been presented for the purposes of illustration and description only and not by limitation. It is therefore contemplated that the present disclosure covers any and all modifications, variations or equivalents that fall within the spirit and scope of the basic underlying principles disclosed above and claimed herein.

What is claimed is:

1. A method, by a computing device, of compiling a plurality of shaders, each shader having a plurality of computer-readable statements, into a plurality of computer-executable instructions, comprising:
   receiving, using the computing device, the plurality of shaders used in a process pipeline for performing at least one shading function;
   determining, using the computing device, a shader type of each of the plurality of shaders to be compiled based on the at least one shading function, the plurality of shader types including one or more of: a vertex shader, a fetch shader, a shader compiled for a merged shader, a geometry shader, a hull shader and a compute shader;
   determining combinable shaders of different types among the plurality of shaders that are combinable at runtime;
   generating a shader descriptor object based on the determined combinable shaders of different types, the shader descriptor object configured to provide data comprising a unique identification number of a shader descriptor, a convention type indicating a call type, return values to a calling shader and a return address of the calling shader; and
   compiling, using the computing device, the plurality of shaders of different types by generating as part of a compiling operation, data including the shader descriptor object in response to determining the shader type of each of the plurality of shaders and generating the computer-executable instructions using the shader descriptor object, resulting in the shading functions of the plurality of shaders combined together.

2. The method of claim 1, wherein the compiling the plurality of shaders by generating the computer-executable instructions using data including the shader descriptor object comprises determining whether to use the shader descriptor object by identifying, for each received shader, at least one combinable shader that is compatible with the received shader based on the shader type of each of the plurality of shaders.

3. The method of claim 2, wherein the compiling the plurality of shaders by generating the computer-executable instructions using data including the shader descriptor object comprises combining, when the shader type is a fetch shader, the fetch shader with a vertex shader at runtime.

4. The method of claim 2, wherein the compiling the plurality of shaders by generating the computer-executable instructions using data including the shader descriptor object comprises combining, when the shader type is a shader compiled for a merged shader, a vertex shader with a hull shader.

5. The method of claim 2, wherein the compiling the plurality of shaders by generating the computer-executable instructions using data including the shader descriptor object comprises combining, when the shader type is a shader compiled for a merged shader, a vertex or domain shader with a geometry shader.

6. The method of claim 2, wherein the compiling the plurality of shaders by generating the computer-executable instructions using data including the shader descriptor object comprises combining, when the shader type is a dispatch draw compute shader, the compute shader with a fetch shader and a transform shader.

7. The method of claim 1, wherein the compiling the plurality of shaders by generating the computer-executable instructions using data including the shader descriptor object comprises combining the plurality of shaders having at least two different shader types.

8. The method of claim 1, wherein the compiling the plurality of shaders by generating the computer-executable instructions using data including the shader descriptor object comprises preserving at least a portion of the data used by at least one of the plurality of shaders.

9. The method of claim 1, wherein the compiling the plurality of shaders by generating the computer-executable instructions using data including the shader descriptor object comprises preventing the data used by at least one of the plurality of shaders from being overwritten.

10. The method of claim 1, wherein the compiling the plurality of shaders by generating the computer-executable instructions using data including the shader descriptor object comprises implementing a generalized call pattern in the plurality of shaders to prevent generating unnecessary data move instructions for the plurality of shaders.

11. The method of claim 1, wherein the compiling the plurality of shaders by generating the computer-executable instructions using data including the shader descriptor object comprises combining at least two of the plurality of shaders together to be executed as a single stage in the process pipeline.

12. The method of claim 1 comprising generating the data descriptor to include subroutine descriptors for one or more of the selected shaders.

13. The method of claim 1 wherein generating the shader descriptor object comprises data representing a unique identification number for the object and convention type indicating a call type.

14. A computing device having a processor operative to compile a plurality of shaders, each shader having a plurality of computer-readable statements, into a plurality of computer-executable instructions, the processor being configured to:
receive, using the computing device, the plurality of shaders used in a process pipeline for performing at least one shading function;
determine, using the computing device, a shader type of each of the plurality of shaders to be compiled based on the at least one shading function, the plurality of shader types including one or more of: a vertex shader, a fetch shader, a shader compiled for a merged shader, a geometry shader, a hull shader and a compute shader;
determine combinable shaders of different types among the plurality of shaders that are combinable at runtime;
generate a shader descriptor object based on the determined combinable shaders of different types, the shader descriptor object configured to provide data comprising a unique identification number of a shader descriptor, a convention type indicating a call type, return values to a calling shader and a return address of the calling shader; and
compile, using the computing device, the plurality of shaders of different types by generating as part of a compiling operation, data including the shader descriptor object in response to determining the shader type of each of the plurality of shaders and generating the computer-executable instructions using the shader descriptor object, resulting in the shading functions of the plurality of shaders combined together.

15. The computing device of claim 14, wherein the processor is further configured to determine whether to use the shader descriptor object by identifying, for each received shader, at least one combinable shader that is compatible with the received shader based on the shader type of each of the plurality of shaders.

16. The computing device of claim 15, wherein the processor is further configured to:
combine, when the shader type is a fetch shader, the fetch shader with a vertex shader at run time;
combine, when the shader type is a shader compiled for a merged shader, either a vertex shader with a hull shader, or a vertex or domain shader with a geometry shader; and
combine, when the shader type is a dispatch draw compute shader, the compute shader with a fetch shader and a transform shader.

17. The computing device of claim 14, wherein the processor is further configured to combine the plurality of shaders having at least two different shader types.

18. The computing device of claim 17, wherein the processor is further configured to:
preserve at least a portion of the data used by at least one of the plurality of shaders; and
prevent the data used by at least one of the plurality of shaders from being overwritten.

19. The computing device of claim 17, wherein the processor is further configured to implement a generalized call pattern in the plurality of shaders to prevent generating unnecessary data move instructions for the plurality of shaders.

20. The method of claim 14, wherein the processor is further configured to combine at least two of the plurality of shaders together to be executed as a single stage in the process pipeline.

21. A non-transitory computer readable storage medium comprising executable instructions that when executed by one or more processors cause the one or more processors to:
receive, using a computing device, a plurality of shaders used in a process pipeline for performing at least one shading function;
determine, using the computing device, a shader type of each of the plurality of shaders to be compiled based on the at least one shading function, the plurality of shader types including one or more of: a vertex shader, a fetch shader, a shader compiled for a merged shader, a geometry shader, a hull shader and a compute shader;
determine combinable shaders of different types among the plurality of shaders that are combinable at runtime;
generate a shader descriptor object based on the determined combinable shaders of different types, the shader descriptor object configured to provide data comprising a unique identification number of a shader descriptor, a convention type indicating a call type, return values to a calling shader and a return address of the calling shader; and
compile, using the computing device, the plurality of shaders of different types by generating as part of a compiling operation, data including the shader descriptor object in response to determining the shader type of each of the plurality of shaders and generating the computer-executable instructions using the shader descriptor object, resulting in the shading functions of the plurality of shaders combined together.

22. The non-transitory computer readable storage medium of claim 21, further comprising executable instructions that when executed by one or more processors cause the one or more processors to:
determine whether to use the shader descriptor object by identifying, for each received shader, at least one combinable shader that is compatible with the received shader based on the shader type of each of the plurality of shaders;
combine the plurality of shaders having at least two different shader types;
preserve at least a portion of the data used by at least one of the plurality of shaders;
prevent the data used by at least one of the plurality of shaders from being overwritten;
implement a generalized call pattern in the plurality of shaders to prevent generating unnecessary data move instructions for the plurality of shaders; and combine at least two of the plurality of shaders together to be executed as a single stage in the process pipeline.

* * * * *